(12) United States Patent
Adams

(10) Patent No.: US 9,477,497 B2
(45) Date of Patent: Oct. 25, 2016

(54) METHODS FOR DETERMINING RESOURCE DEPENDENCY AND SYSTEMS THEREOF

(75) Inventor: Kyle Adams, West Henrietta, NY (US)

(73) Assignee: Juniper Networks, Inc., Sunnyvale, CA (US)

(*) Notice: Subject to any disclaimer, the term of this patent is extended or adjusted under 35 U.S.C. 154(b) by 845 days.

(21) Appl. No.: 12/568,566

(22) Filed: Sep. 28, 2009

(65) Prior Publication Data

US 2010/0169863 A1 Jul. 1, 2010

Related U.S. Application Data

(60) Provisional application No. 61/194,448, filed on Sep. 26, 2008.

(51) Int. Cl.
*G06F 9/44* (2006.01)
*G06F 9/445* (2006.01)

(52) U.S. Cl.
CPC ............. *G06F 9/44521* (2013.01); *G06F 8/20* (2013.01); *G06F 8/71* (2013.01)

(58) Field of Classification Search
CPC ............. G06F 8/36; G06F 8/20; G06F 8/71; G06F 9/44521
USPC ........................................................ 717/120
See application file for complete search history.

(56) References Cited

U.S. PATENT DOCUMENTS

| 6,101,328 | A | * | 8/2000 | Bakshi et al. | 717/170 |
| 6,421,700 | B1 | * | 7/2002 | Holmes et al. | 718/100 |
| 7,757,215 | B1 | * | 7/2010 | Zhou et al. | 717/124 |
| 2004/0045019 | A1 | * | 3/2004 | Bracha et al. | 719/332 |
| 2005/0193139 | A1 | * | 9/2005 | Vinson | G06F 9/445 709/231 |
| 2006/0150145 | A1 | * | 7/2006 | Khandekar | 717/106 |
| 2006/0156310 | A1 | * | 7/2006 | Powers, III | 718/107 |
| 2006/0277286 | A1 | * | 12/2006 | Zhang et al. | 709/223 |
| 2009/0144631 | A1 | * | 6/2009 | Berryman et al. | 715/736 |
| 2009/0193036 | A1 | * | 7/2009 | Petri | 707/100 |
| 2009/0208098 | A1 | * | 8/2009 | Yang | 382/164 |
| 2009/0217259 | A1 | * | 8/2009 | Winter et al. | 717/174 |
| 2009/0327940 | A1 | * | 12/2009 | Duncan et al. | 715/765 |
| 2010/0050156 | A1 | * | 2/2010 | Bonanno et al. | 717/122 |
| 2010/0073381 | A1 | | 3/2010 | Adams | |

* cited by examiner

*Primary Examiner* — Li B Zhen
*Assistant Examiner* — Bradford Wheaton
(74) *Attorney, Agent, or Firm* — Shumaker & Sieffert, P.A.

(57) ABSTRACT

A method, computer readable medium, and system for automatically determining resource dependency includes automatically identifying with an application processing device one or more dependencies between two or more modules in an application. The application processing device determines one or more ordered lists of executing the modules based on the identified one or more dependencies. The application processing device provides the determined one or more ordered lists of executing the modules in the application.

22 Claims, 20 Drawing Sheets

```
A.css
BODY {
        font-family: Arial;
        font-size: 12px;
        color: black;
}
```

FIG. 1A

```
B.css
BODY {
        font-family: Courier New;
        color: red;
}
```

FIG. 1B

```
BODY {
        font-family: Courier New;
        font-size: 12px;
        color: red;
}
```

FIG. 2A

```
BODY {
        font-family: Arial;
        font-size: 12px;
        color: black;
}
```

FIG. 2B

```
<html>
    <head>
        <link re? "stylesheet" rev="stylesheet"  href=A.css?>
        <link re? "stylesheet" rev="stylesheet"  href=B.css?>
    </head>
    <body>
        Sample Text
    </body>
</html>
```

FIG. 3

```
A.js
function helloWorld(){
        alert("Hello World");
}
```

FIG. 4A

```
B.js
helloWorld();
```

FIG. 4B

```
helloWorld is not defined
```

FIG. 5

```
<html>
    <head>
        <script type='text/javascript' src='A.js'></script>
        <script type='text/javascript' src='B.js'></script>
    </head>
    <body>
        Sample Text
    </body>
</html>
```

FIG. 6

```html
<html>
    <head>
        <script type="text/javascript" src="A.js"></script>
        <script type="text/javascript" src="J.js"></script>
        <script type="text/javascript" src="H.js"></script>
        <script type="text/javascript" src="I.js"></script>
        <script type="text/javascript" src="K.js"></script>
        <script type="text/javascript" src="E.js"></script>
        <script type="text/javascript" src="L.js"></script>
        <script type="text/javascript" src="M.js"></script>
        <script type="text/javascript" src="F.js"></script>
        <script type="text/javascript" src="B.js"></script>
        <script type="text/javascript" src="C.js"></script>
        <script type="text/javascript" src="N.js"></script>
        <script type="text/javascript" src="D.js"></script>
        <link rel="stylesheet" rev="stylesheet" href="A.css" />
        <link rel="stylesheet" rev="stylesheet" href="J.css" />
        <link rel="stylesheet" rev="stylesheet" href="H.css" />
        <link rel="stylesheet" rev="stylesheet" href="I.css" />
        <link rel="stylesheet" rev="stylesheet" href="K.css" />
        <link rel="stylesheet" rev="stylesheet" href="E.css" />
        <link rel="stylesheet" rev="stylesheet" href="L.css" />
        <link rel="stylesheet" rev="stylesheet" href="M.css" />
        <link rel="stylesheet" rev="stylesheet" href="F.css" />
        <link rel="stylesheet" rev="stylesheet" href="B.css" />
        <link rel="stylesheet" rev="stylesheet" href="C.css" />
        <link rel="stylesheet" rev="stylesheet" href="N.css" />
        <link rel="stylesheet" rev="stylesheet" href="D.css" />
    </head>
    <body>
        Sample Text
    </body>
</html>
```

*FIG. 7*

METHODS FOR DETERMINING RESOURCE DEPENDENCY AND SYSTEMS THEREOF

This application claims the benefit of U.S. Provisional Patent Application Ser. No. 61/194,448, filed Sep. 26, 2008, which is herein incorporated by reference in its entirety.

FIELD OF THE INVENTION

The present invention relates to methods for automatically determining resource dependency in an application and systems thereof.

BACKGROUND

In order to for an application to function, a developer needs to know all of the resources which must be included. Traditionally, application developers have been required to manually determine which resources are needed, and the correct loading order so that the browser can load the application and not to return an error message.

Unfortunately, the difficulty with putting all of the pieces in order is knowing which resource files or resources depend on other resources being loaded first. This is extremely problematic when a developer has to make a change to an application in some way. In this example, the developer is required to go back and ensure the new code is put into the right order for the browser to display the application and render the new feature usable. Any changes also may cause other resources to change their dependencies and therefore change the overall ordering of the resource loading. Loading resource out of order can result in unintended behavior and errors.

An example of the importance in web applications of the order in which resources are loaded into the browser is illustrated and discussed below. Consider the following two Cascade Style Sheet (CSS) files: A.css shown in FIGS. 1A and B.css shown in FIG. 1B. If A.css is loaded before B.css, then the resulting BODY style is illustrated in FIG. 2A. If however, B.css is loaded before A.css, then the resulting BODY style is illustrated in FIG. 2B.

Since a developer clearly wants a resulting application to use consistent and intended styling, it is important for the developer to be able to define which resource file is loaded first. Traditionally this is done by hard coding references to the CSS resource files in the correct order within an HTML file. An example of how two such CSS resource files would be loaded in a traditional web application is illustrated in FIG. 3. The browser would load resource file A.css and then resource file B.css because that is the order they are referenced in.

This same problem also will occur with other types of resource files. For example, consider two JavaScript resource files: resource file A.js shown in FIG. 4A and resource file B.js in FIG. 4B. If resource file B.js is loaded before resource file A.js, then the JavaScript error illustrated in FIG. 5 will occur. However, if resource file A.js is loaded before resource file B.js, then the browser will open an alert dialog with the text "Hello World" as intended. To ensure that resource file A.js always is loaded before resource file B.js, the order in which these scripts are loaded is hard coded into the HTML document that uses them. An example of an HTML document file that includes resource file A.js and resource file B.js in the correct order is illustrated in FIG. 6.

Accordingly, when the number of resource files increases, the difficulty of maintaining hard coded and correctly ordered lists of resources in the HTML file becomes very challenging and time consuming. By way of example, consider the HTML file shown in FIG. 7 and assume initially all of the necessary resource files are in the correct loading order. If subsequently a change is made to resource file C.js. The change involves calling a function defined in resource file D.js, which is currently loaded after resource file C.js. This change will require resource file D.js to be moved prior to resource file C.js, which may require the relocation of several other resource files in order to maintain the dependent relationships resource file D.js may have had with all of its preceding scripts, such as calling a function from resource file D.js which is defined in resource file N.js by way of example. As this example illustrates, maintaining the correct resource dependency becomes increasingly more difficult to manage as the number of resources increases.

SUMMARY

A method for automatically determining resource dependency in accordance with embodiments of the present invention includes automatically identifying with an application processing device one or more dependencies between two or more modules in an application. The application processing device determines one or more ordered lists of executing the modules based on the identified one or more dependencies. The application processing device provides the determined one or more ordered lists of executing the modules in the application.

A computer readable medium in accordance with other embodiments of the present invention includes instructions stored thereon for automatically determining resource dependency comprising machine executable code which when executed by at least one processor, causes the processor to perform steps includes identifying one or more dependencies between two or more modules in an application. One or more ordered lists of executing the modules is automatically determined based on the identified one or more dependencies. The determined one or more ordered lists of executing the modules in the application is provided.

A system that automatically determines resource dependency in accordance with other embodiments of the present invention includes an identification system, a resource dependency processing system, and an interface system in an application computing device. The identification system identifies one or more dependencies between two or more modules in an application. The resource dependency processing system determines one or more ordered lists of executing the modules based on the identified one or more dependencies. The interface system provides the determined one or more ordered lists of executing the modules in the application.

The present invention provides a number of advantages including providing an easier and more effective method and system for automatically determining resource dependency in an application. Additionally, embodiments of the present invention are able to minimize number of resources loaded into the browser in order to function correctly are loaded and are able to defer loading of some resources. Embodiments of the present invention also are designed to facilitate deferred loading of resources in the browser to provide a load on demand environment. With the present invention, if a browser needs additional resources in order to perform a specific action, those resources will be downloaded during run-time as needed.

BRIEF DESCRIPTION OF THE DRAWINGS

FIG. 1A is a diagram of an exemplary resource file comprising a cascade style sheet resource file A.css;

FIG. 1B is a diagram of an exemplary resource file comprising a cascade style sheet resource file B.css;

FIG. 2A is a diagram of an exemplary resulting body style in an application when the exemplary resource file A.css shown in FIG. 1A is loaded before the exemplary resource file B.css shown in FIG. 1B;

FIG. 2B is a diagram of an exemplary resulting body style in an application when exemplary resource file B.css shown in FIG. 1B is loaded before exemplary resource file A.css shown n FIG. 1A;

FIG. 3 is a diagram of the exemplary resource file A.css shown n FIG. 1A and the exemplary resource file B.css shown in FIG. 1B loaded in a traditional web application is illustrated in FIG. 3;

FIG. 4A is a diagram of an exemplary resource file comprising a JavaScript resource file A.js;

FIG. 4B is a diagram of an exemplary resource file comprising a JavaScript resource file B.js;

FIG. 5 is a diagram of a resulting exemplary JavaScript error message when resource file B.js shown in FIG. 4B is loaded before resource file A.js shown in FIG. 4A;

FIG. 6 is a diagram of an exemplary an HTML document file when resource file A.js shown in FIG. 4A is loaded before resource file B.js shown in FIG. 4B;

FIG. 7 is a diagram of an exemplary HTML document file with a plurality of JavaScript files and cascade style sheet files;

DETAILED DESCRIPTION

Figure 8:
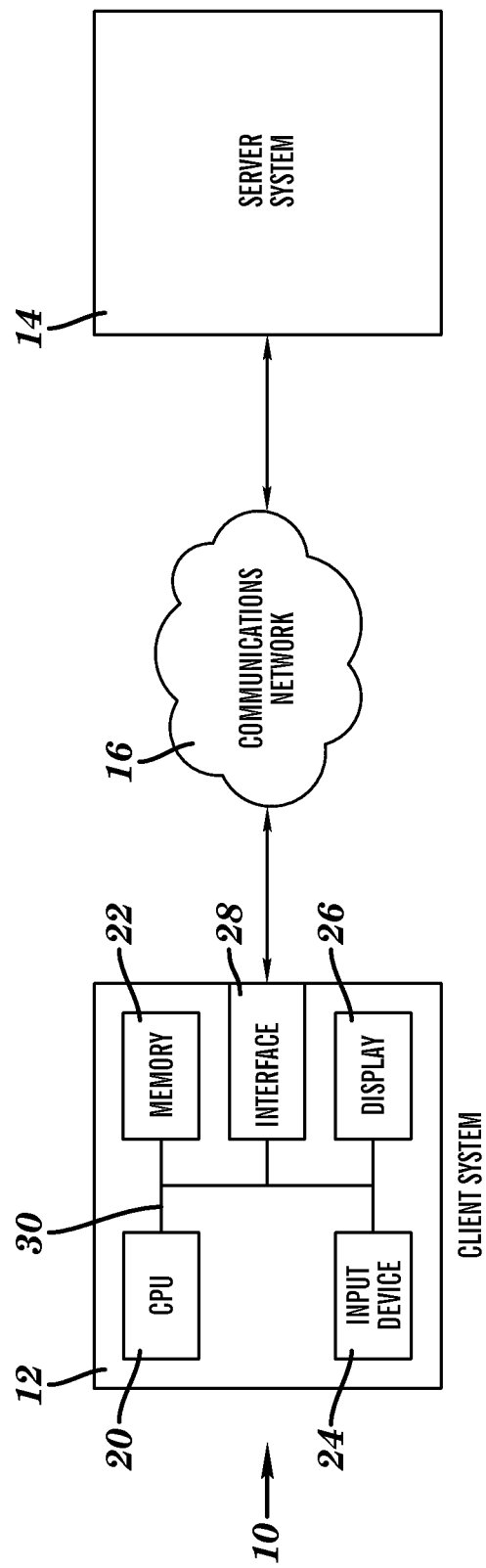
FIG. 8 is a block diagram of a system that determines resource dependency in an application in accordance with embodiments of the present invention.

A system 10 that automatically determines resource dependency in accordance with embodiments of the present invention is illustrated in FIG. 8. The system 10 includes a client computing device 12, a server 14, and a communications network 16, although the system 10 can include other types and numbers of components connected in other manners. The present invention provides a number of advantages including providing an easier and more effective method and system for automatically determining resource dependency in an application.

Referring more specifically to FIG. 8, the client computing device 12 is used to initiate and execute determining resource dependency in an application, although other types and numbers of systems could be used, and other types and numbers of functions can be performed by the user computing system. The client computing device 12 includes a central processing unit (CPU) or processor 20, a memory 22, user input device 24, a display 26, and an interface system 28, and which are coupled together by a bus 30 or other link, although the client computing device 12 can include other numbers and types of components, parts, devices, systems, and elements in other configurations. The processor 20 executes a program of stored instructions for one or more aspects of the present invention as described and illustrated herein, although the processor could execute other numbers and types of programmed instructions.

The memory 22 stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to one or more processors, can be used for the memory 22.

The user input device 24 in the client computing device 12 is used to input selections, such as request to initiate an automated determination of resource dependency, although the user input device 24 could be used to input other types of data and interact with other elements. The user input device 24 can include a computer keyboard and a computer mouse, although other types and numbers of user input devices can be used. The display 26 in the client computing device 12 is used to show data and information to the user, such as the ordered and minimized lists by way of example only. The display 26 can include a computer display screen, such as a CRT or LCD screen, although other types and numbers of displays could be used.

The interface system 28 is used to operatively couple and communicate between the client computing device 12 and the server 14 over a communication network 16, although other types and numbers of communication networks or systems with other types and numbers of connections and configurations to other types and numbers of systems, devices, and components can be used. By way of example only, the communication network 16 can use TCP/IP over Ethernet and industry-standard protocols, including SOAP, XML, LDAP, and SNMP, although other types and numbers of communication networks, such as a direct connection, a local area network, a wide area network, modems and phone lines, e-mail, and wireless communication technology, each having their own communications protocols, can be used.

The server 14 also can be used to provide one or more resources, data and instructions relating to determining resource dependency, although the server 14 can perform other types and numbers of functions. The server 14 includes a central processing unit (CPU) or processor, a memory, and an interface system which are coupled together by a bus or other link, although other numbers and types of each of the components and other configurations and locations for the components can be used. The processor in server 14 executes a program of stored instructions for one or more aspects of the present invention as described herein. The memory in server 14 stores these programmed instructions for one or more aspects of the present invention as described herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor, can be used for the memory in server 14. The interface system in server 14 is used to operatively couple and communicate between the server 14 and the client computing device 12, although other types of connections and other types and combinations of systems could be used.

Although embodiments of the client computing device 12 and server 14 are described and illustrated herein, the user computing system 12 and server 14 can be implemented on any suitable computer system or computing device. It is to be understood that the devices and systems of the embodiments described herein are for exemplary purposes, as many variations of the specific hardware and software used to implement the embodiments are possible, as will be appreciated by those skilled in the relevant art(s).

Furthermore, each of the systems of the embodiments may be conveniently implemented using one or more general purpose computer systems, microprocessors, digital signal processors, and micro-controllers, programmed according to the teachings of the embodiments, as described and illustrated herein, and as will be appreciated by those ordinary skill in the art.

In addition, two or more computing systems or devices can be substituted for any one of the systems in any embodiment of the embodiments. Accordingly, principles and advantages of distributed processing, such as redundancy and replication also can be implemented, as desired, to increase the robustness and performance of the devices and systems of the embodiments. The embodiments may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as a computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

The method for automatically determining resource dependency in an application in accordance with the exemplary embodiments will now be described with reference to FIGS. 8-27. Although in this particular example, the processing steps described herein are substantially executed by client computing device 12 as described below, some or all of these steps can be executed by other systems, devices, or components. Before proceeding with an example of a method for automatically determining resource dependency in an application, a description of components involved in different embodiments of the present invention is set forth below.

Resource: A resource is a file that contains information used by the browser to run the application and contains static content, although a resource may have other types and amounts of information and instructions. By way of example only, a resource can include CSS, JavaScript, Images, XML, Flash Movies, and sound files.

Figure 9:
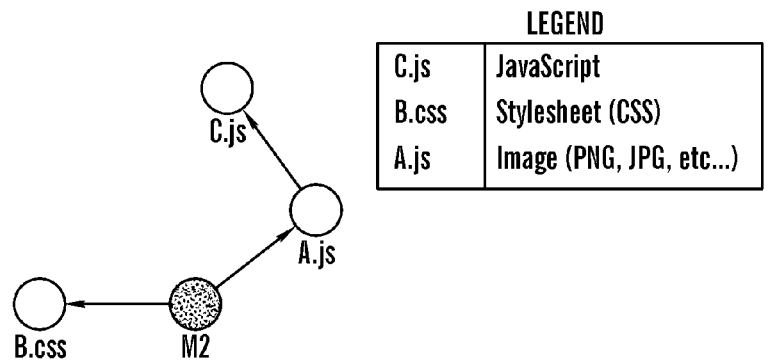
FIG. 9 is a diagram illustrating an exemplary module.

Module: A module is a collection of resources that all contribute to a logical piece of the overall application architecture, although a module can contain other types and amounts of elements. By way of example only, stored programmed instructions needed to provide AES encryption would likely be included in an "Encryption" module and stored programmed instructions needed to display buttons would be included in the "Button" module. An exemplary diagram illustrating a simple module is shown in FIG. 9. The node labeled M2 represents the root node of the graph and is not a resource.

The arrows in the diagram shown in FIG. 9 represent dependencies which illustrate the proper loading order between files within the same module. If resource file A.js depends on resource file C.js, then it is guaranteed that resource file C.js will be loaded before resource file A.js. In this example, CSS resource files and JavaScript resource files are the two file types which support dependencies, although other numbers and types of resource file types could be added which might require dependency support.

Figure 10:
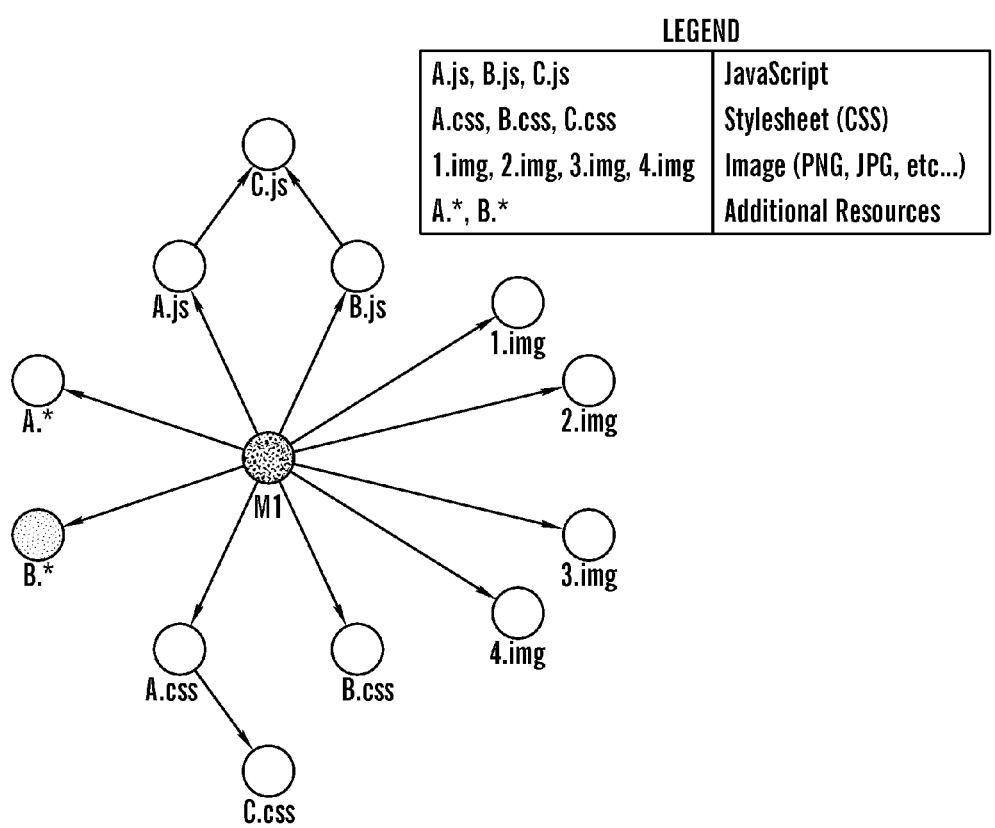
FIG. 10 is a diagram illustrating another exemplary module.

A more complicated module with many resources and more complex dependency patterns is illustrated in FIG. 10. Modules can range from a single resource file to an unlimited number of resource files. As long as there are no circular dependencies, the dependency complexity can be unlimited as well. In most applications, a good design would involve the use of more modules with fewer resource files in each. In the example illustrated in FIG. 10, the additional resources nodes represent a wildcard file type. While modules have several core file types that are considered special cases (JavaScript, CSS, and Images), the module may also contain any arbitrary file format necessary. For example, if a module was used to display a flash logo, it might include a .SWF file.

Root Module: A root module is a normal module that defines a starting point for determining resource dependency. Each root module will result in a unique mutually exclusive ordered resource list. These ordered lists can then be loaded at different times during execution to achieve deferred loading. For example, each application in the system architecture might be considered a root module. As such, each application would have its own ordered resource list. When the browser attempted to launch a new application, it would download the associated ordered resources on the fly.

Hard Dependency: A hard or fixed loading order dependency is a relationship between two modules, where the first module cannot be loaded into the browser unless the second module has been loaded first. For example, if module A has a hard dependency on module B, then module B is guaranteed to be loaded before module A.

Soft Dependency: A soft or flexible loading order dependency is a relationship between two modules where the second module must be loaded if the first module is loaded. However, with a soft dependency no constraint on the ordering of the dependent modules is imposed. For example, if module A has a soft dependency on module B, then if module A is included, module B will also be included. However unlike a hard dependency, module A can be loaded before or after module B.

Figures 11, 12:
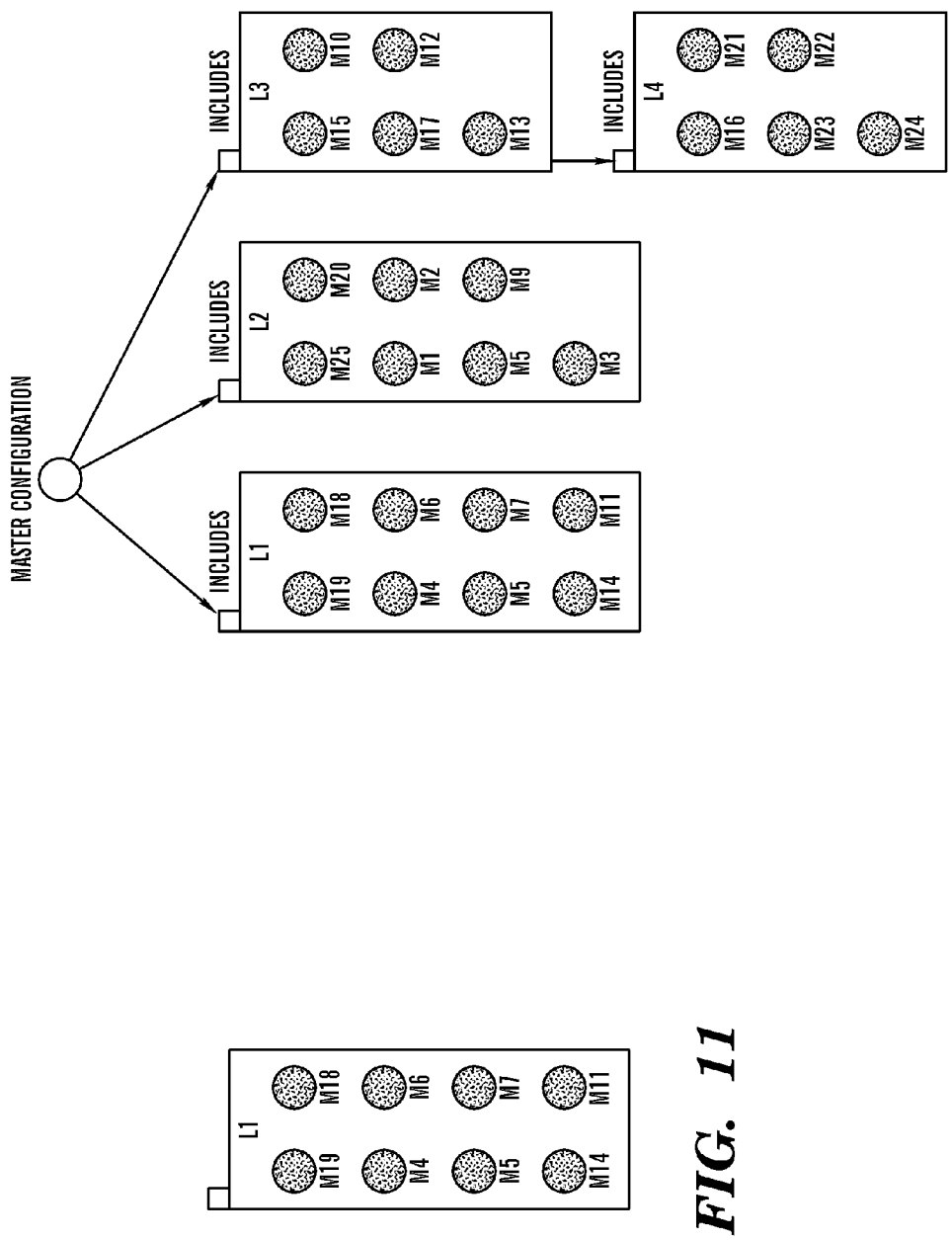
FIG. 11 is a diagram illustrating an exemplary library.
FIG. 12 is a diagram illustrating an exemplary master configuration.

Library: A library is a collection of modules which tend to serve a similar purpose, but also could have no relationship whatsoever. Libraries are provided mainly as a way of name spacing. It would become difficult to ensure that each module had a unique name once the number of modules increased significantly. As such, the libraries provide a unique namespace to all modules contained within the library. By way of example only, a diagram of a library L1 comprising modules M19, M18, M4, M8, M6, M7, M14, and M11 is illustrated in FIG. 11. Accordingly, to summarize a library contains one or more modules and each module contains one or more resource files. For ease of illustration, the resources contained within each module are not illustrated in FIG. 11. Definitions of libraries are usually stored in XML files each of which point to each of the modules included in a library, however the definitions could be stored and acquired in other manners and from other sources.

Master Configuration: A master configuration file is used to define parameters of a process including which libraries are to be considered when building the ordered lists, although the configuration file can have other purposes. In this example, a stored XML file is used to define a path to the definitions of the libraries that should be included. However, the master configuration parameter information can be obtained in other manners from other sources. By way of example only, a diagram of a master configuration including a set of libraries L1, L2, L3, and L4 are illustrated in FIG. 12. In this example: library L1 includes modules M19, M18, M4, M8, M6, M7, M14, and M11; library L2 includes modules M25, M20, M1, M2, M5, M9, and M3; library L3 includes modules M15, M10, M17, M12, and M13; and library L4 includes modules M16, M21, M23, M22, and M24, although a master configuration list could comprise other types and numbers of libraries and modules. In this particular example, notice that library L4 is not directly being included by the master configuration, because as illustrated libraries can link to other libraries. The relationship between L3 and L4 is meaningless, except that it ensures that when L3 is included, L4 will be as well. The namespaces will remain independent.

The master configuration is also responsible for defining which modules in each library are to be considered the root modules. As mentioned in the description of root modules above, a unique mutually exclusive ordered resource list will be produced for each root module. In this particular example, each application in the system architecture is represented by a base module which also is considered a root module. As a result, each of these applications would produce a mutually exclusive ordered resource list.

Figure 13:
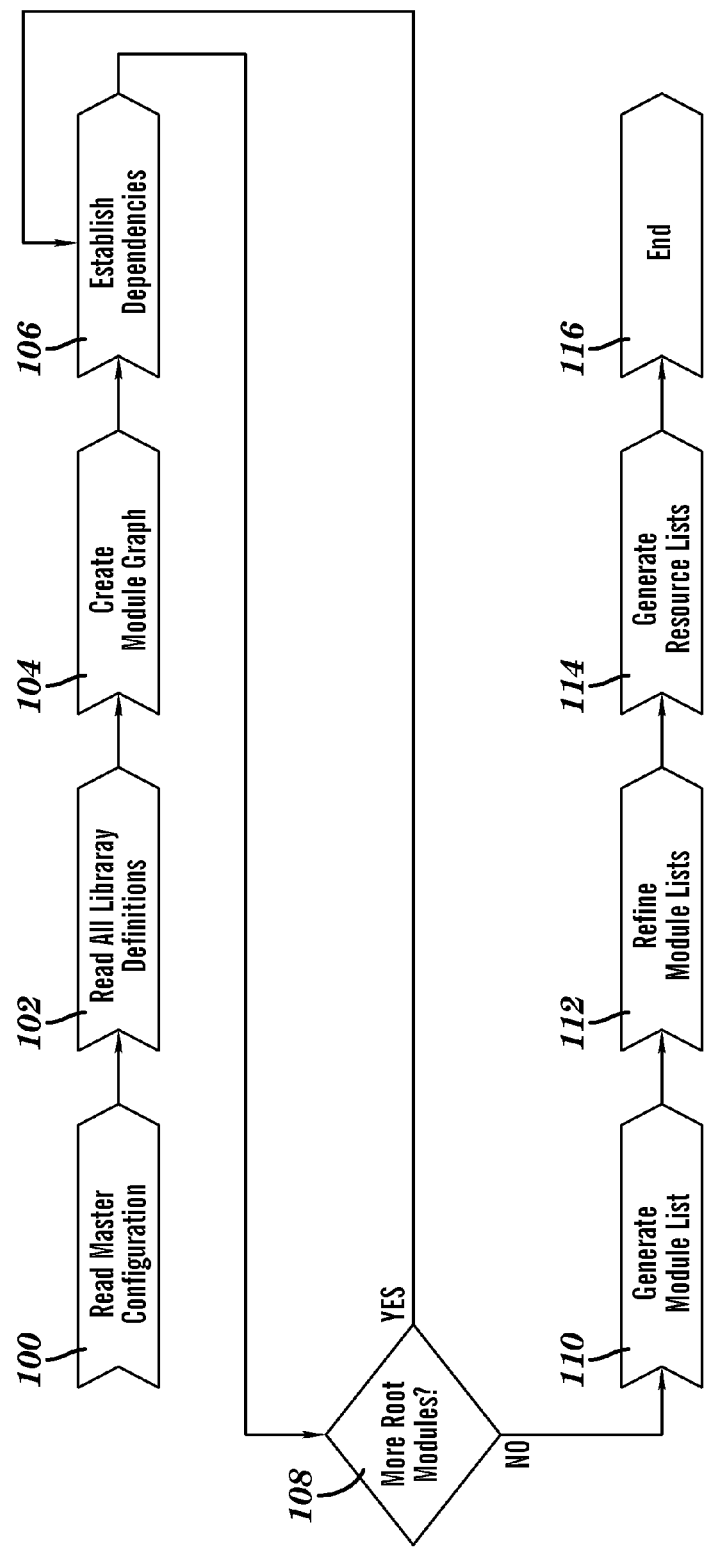
FIG. 13 is a flowchart of a method for automatically determining resource dependency in an application in accordance with embodiments of the present invention.

A method for automatically determining resource dependency in an application in accordance with the exemplary embodiments will now be described in greater detail with reference to FIG. 13. In step 100, the client computing device 12 obtains an XML file with the master configuration from memory, although the master configuration information can be retrieved in other manners and from other sources. The client computing device 12 reads the retrieved XML file with the master configuration to obtain a list of the one or more libraries for the application as well as a list of root modules, although other types and amounts of information can be obtained.

In step 102, the client computing device 12 also uses the obtained XML file to obtain the definitions of the identified one or more libraries to identify the one or more modules in each of the libraries as well as the one or more modules which are root modules, although the definitions could be obtained in other manners from other sources and the modules and root modules can be obtained in other manners.

Figure 14:
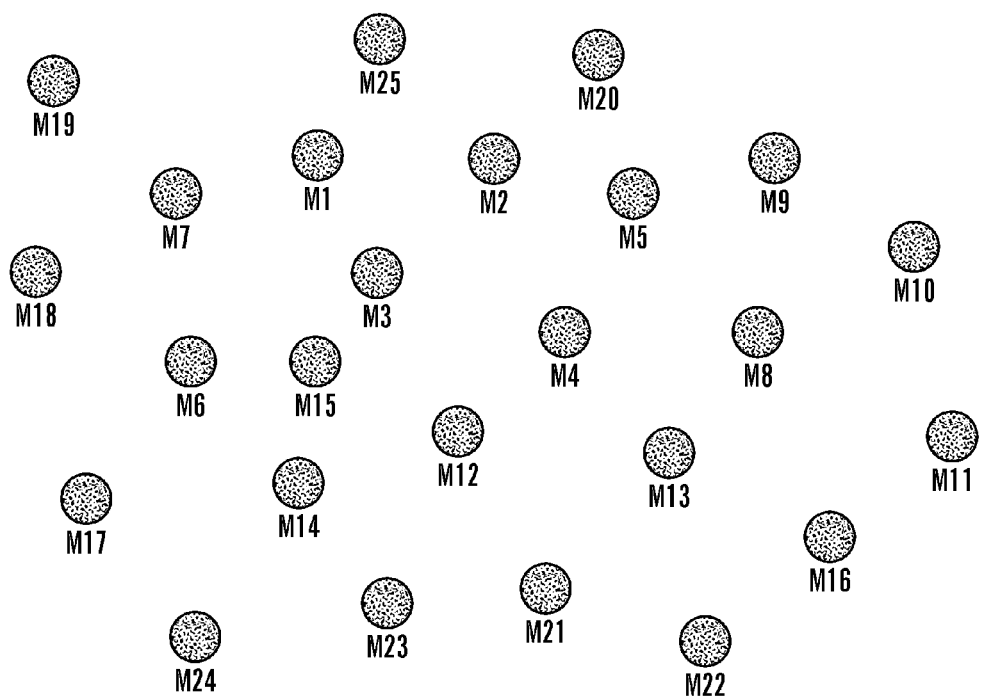
FIG. 14 is a diagram of an exemplary graph of modules identified for an application.

In step 104, the client computing device 12 uses the obtained XML file to automatically obtain the definitions of the identified modules to identify the one or more resource files in each of the libraries, although the definitions could be obtained in other manners from other sources and the resource files can be obtained in other manners. By way of example only, a graph with each of the modules M1-M25 identified by the client computing device 12 is illustrated in FIG. 14. Each of the modules M1-M25 in this graph is identified by a vertex.

In step 106, the client computing device 12 automatically selects one of the identified root modules and determines any soft and hard dependencies from the identified root module, although other manners for determining soft and hard dependencies between modules can be used.

In step 108, the client computing device 12 determines if there are any identified and unprocessed root modules for identifying any soft and hard dependencies from the identified root module. If the client computing device 12 determines there are any identified and unprocessed root modules, then the Yes branch is taken back to step 106 where another one of the identified root modules is selected and any soft and hard dependencies from the identified root module are determined.

By way of example only, in the first pass root module M7 might be selected by client computing device 12 and no dependencies are identified. Next, one of the unprocessed root modules M18, M25, M20, M11, M21, M12, and M6 is automatically selected by client computing device 12, such as root module M18, and one soft dependency from root module M18 to module M17 is identified by the client computing device 12. In this example, a soft dependency between modules is represented by a dashed arrow and a hard dependency is represented by a solid arrow. This process of selecting another one of the identified and unprocessed root modules and determining any soft and hard dependencies is separately illustrated for each of the remaining root modules M25, M20, M11, M21, M12, and M6 in FIGS. 16-21 (the selected root module and identified dependents are shown as white circles in each of the figures).

Figure 15:
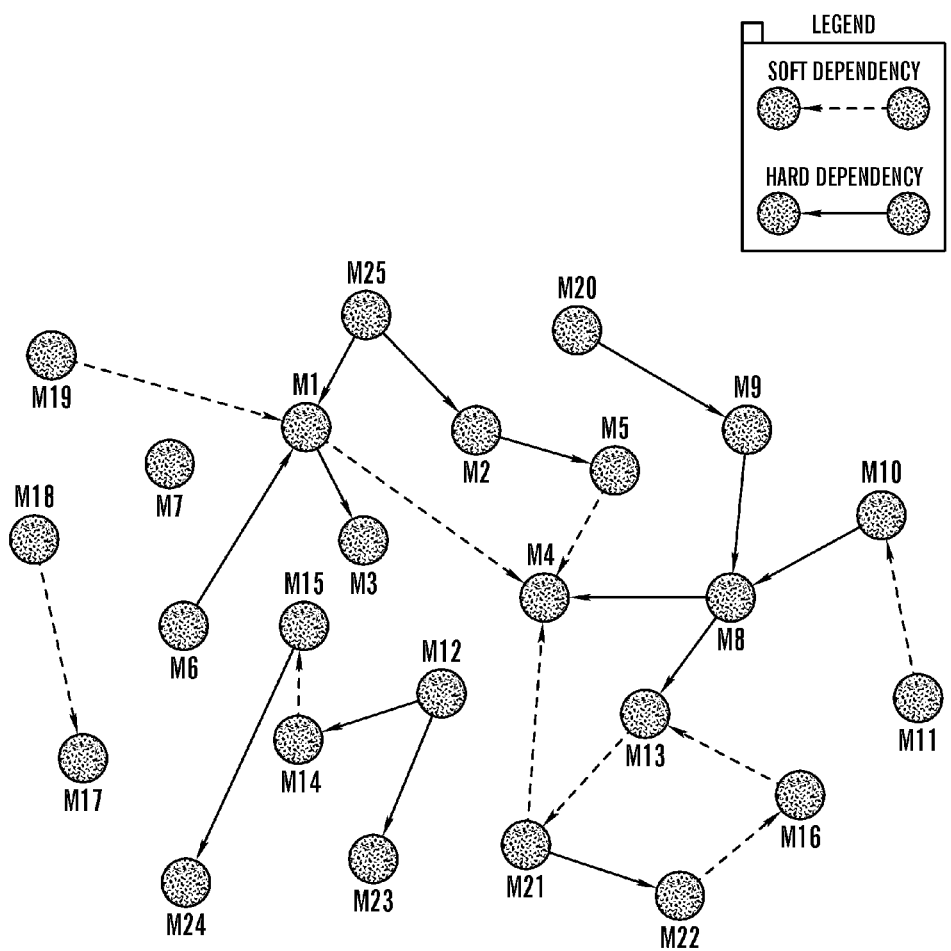
FIG. 15 is a diagram of the exemplary graph of modules illustrated in FIG. 14 with hard dependencies and soft dependencies between the modules.
Figure 16:
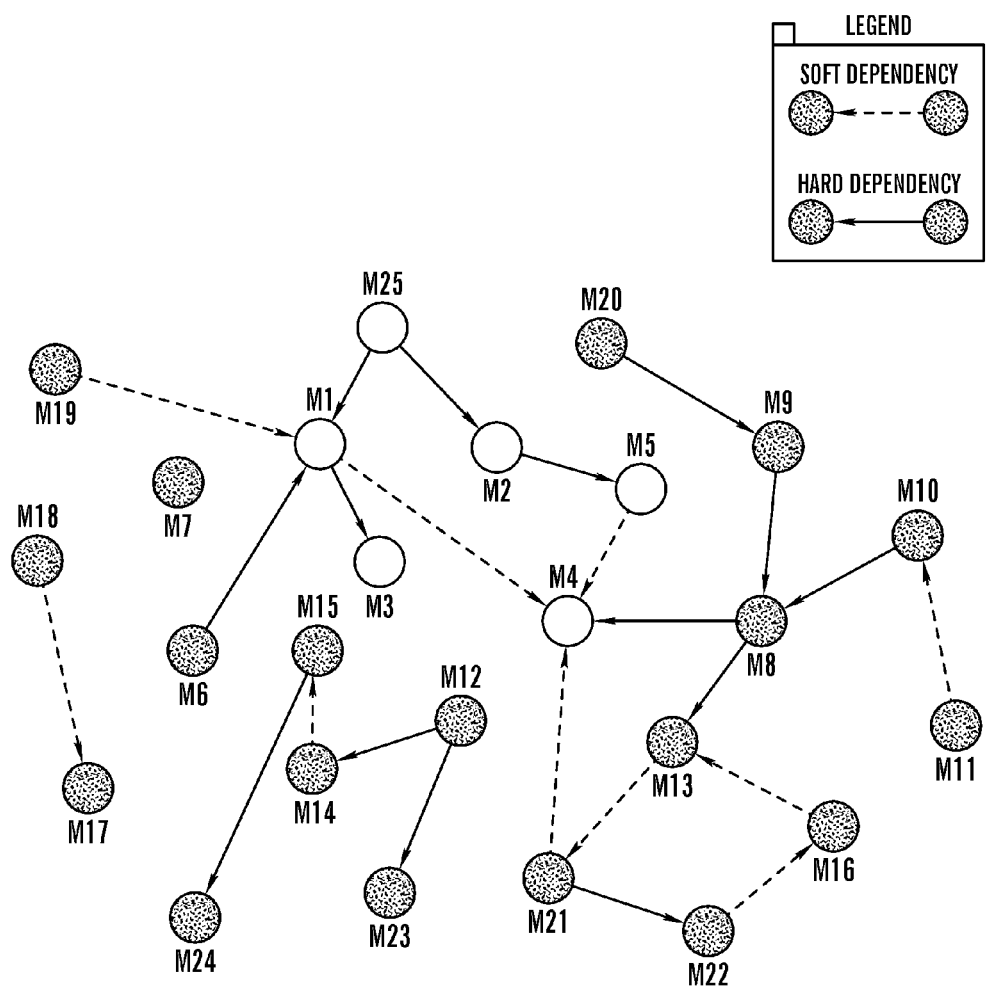
FIG. 16 is a diagram of an exemplary graph of the modules illustrated in FIG. 14 with any hard dependencies and soft dependencies between root module M25 and other modules.
Figure 17:
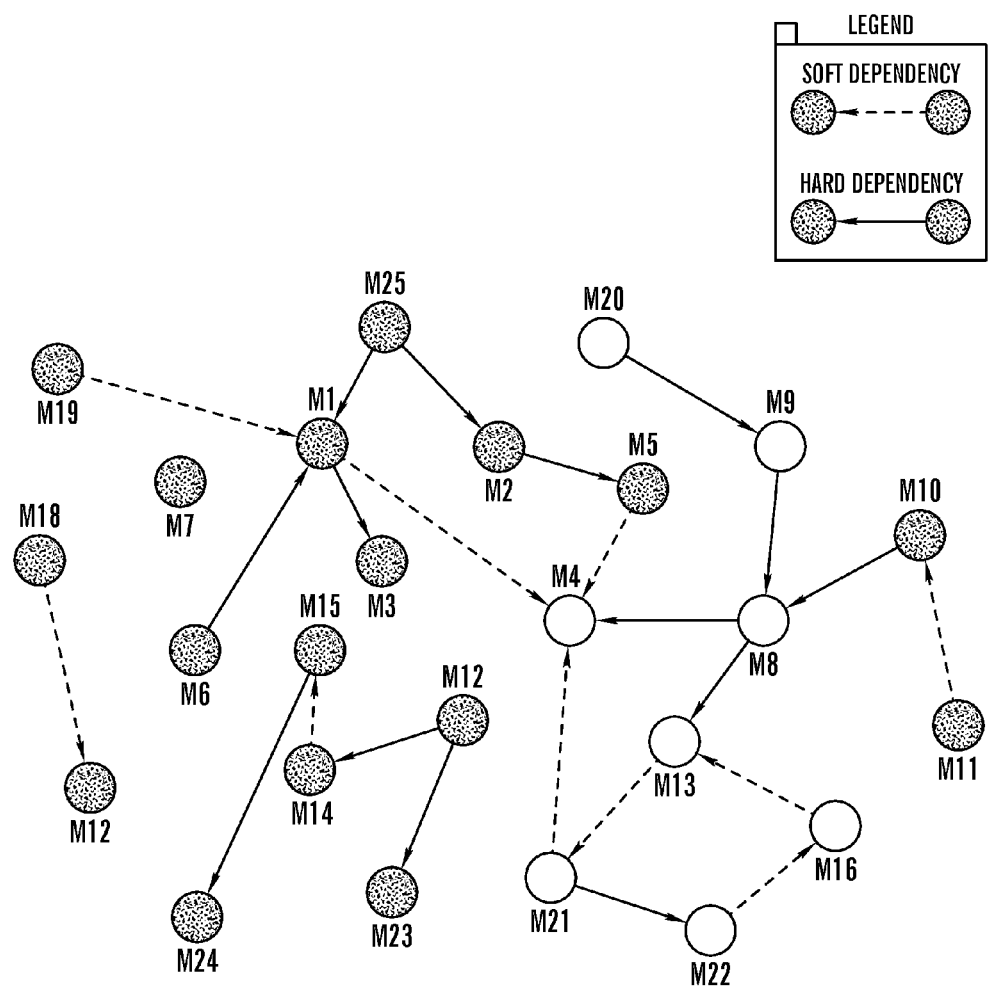
FIG. 17 is a diagram of an exemplary graph of the modules illustrated in FIG. 14 with any hard dependencies and soft dependencies between root module M20 and other modules.
Figure 18:
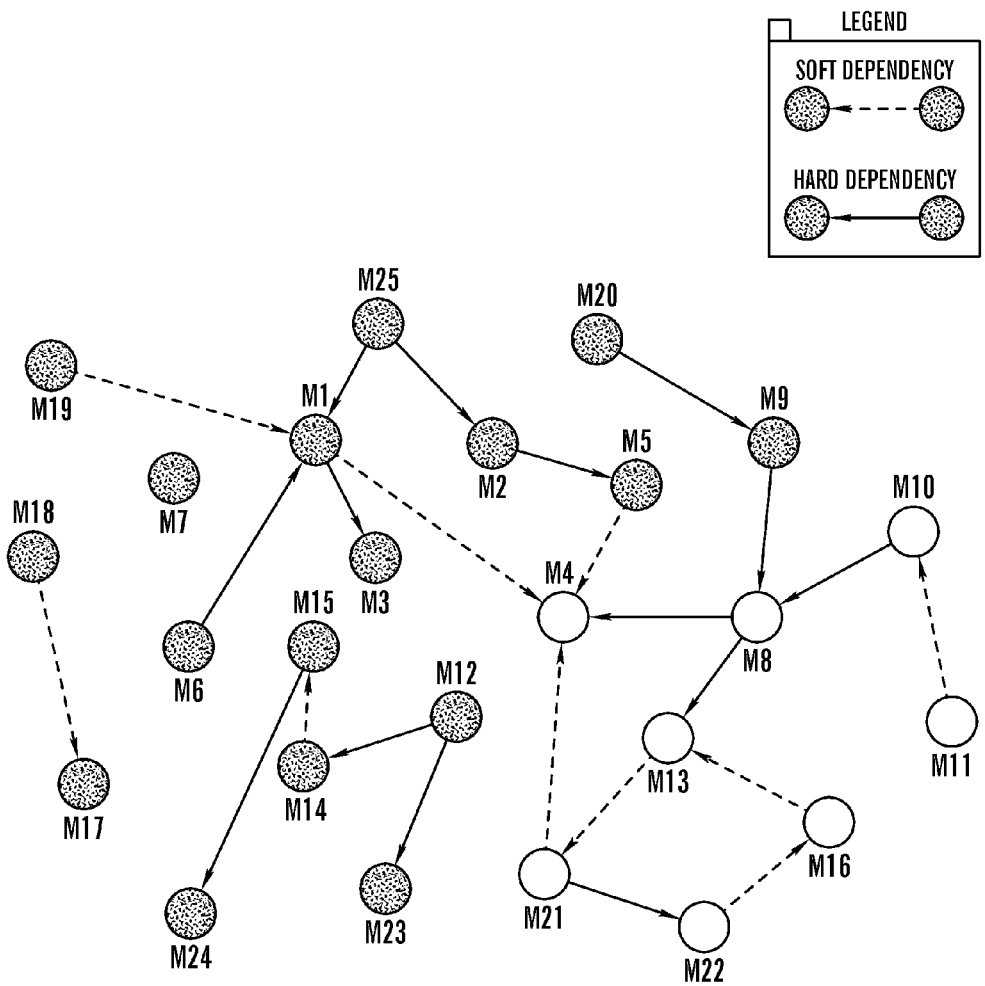
FIG. 18 is a diagram of an exemplary graph of the modules illustrated in FIG. 14 with any hard dependencies and soft dependencies between root module M11 and other modules.
Figure 19:
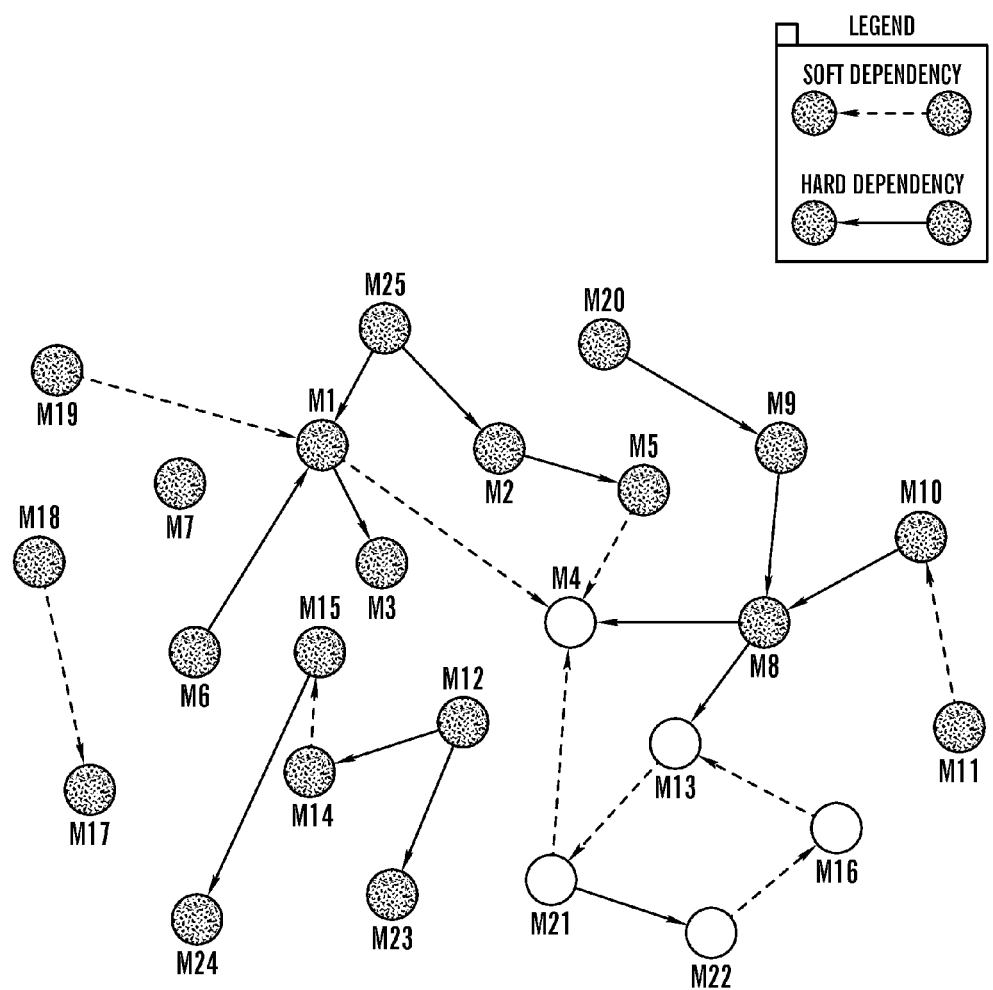
FIG. 19 is a diagram of an exemplary graph of the modules illustrated in FIG. 14 with any hard dependencies and soft dependencies between root module M13 and other modules.
Figure 20:
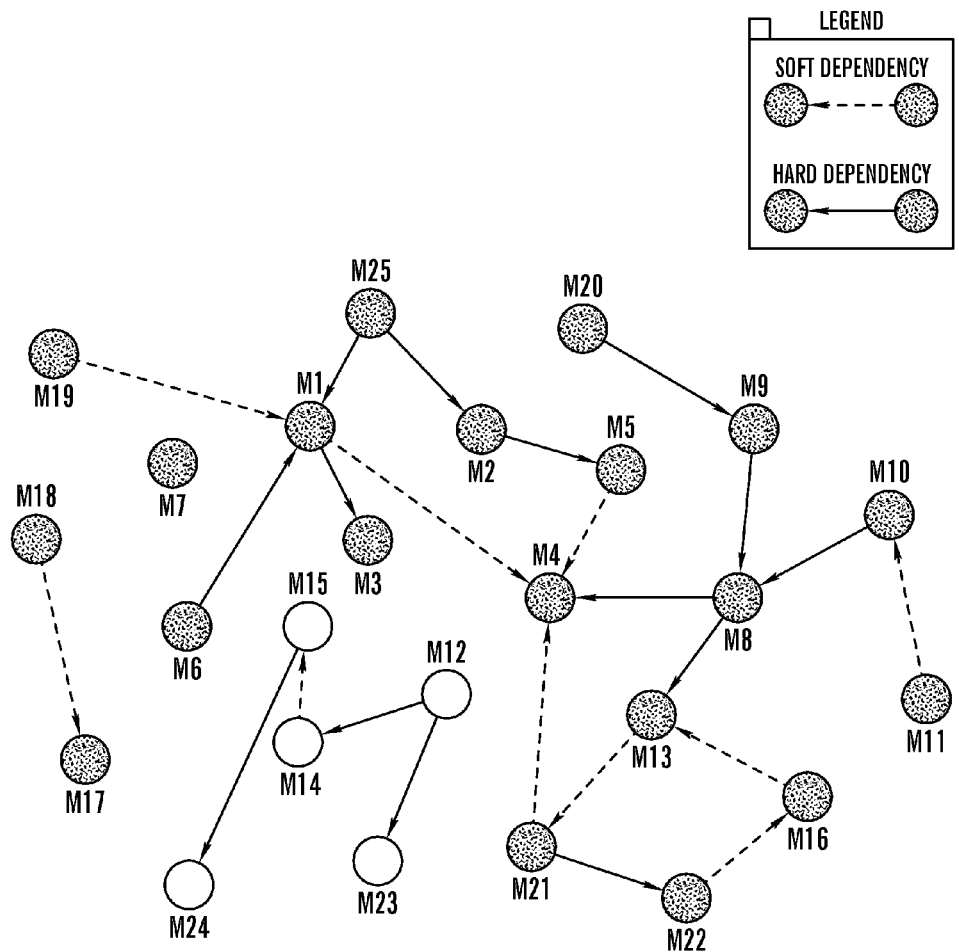
FIG. 20 is a diagram of an exemplary graph of the modules illustrated in FIG. 14 with any hard dependencies and soft dependencies between root module M12 and other modules.
Figure 21:
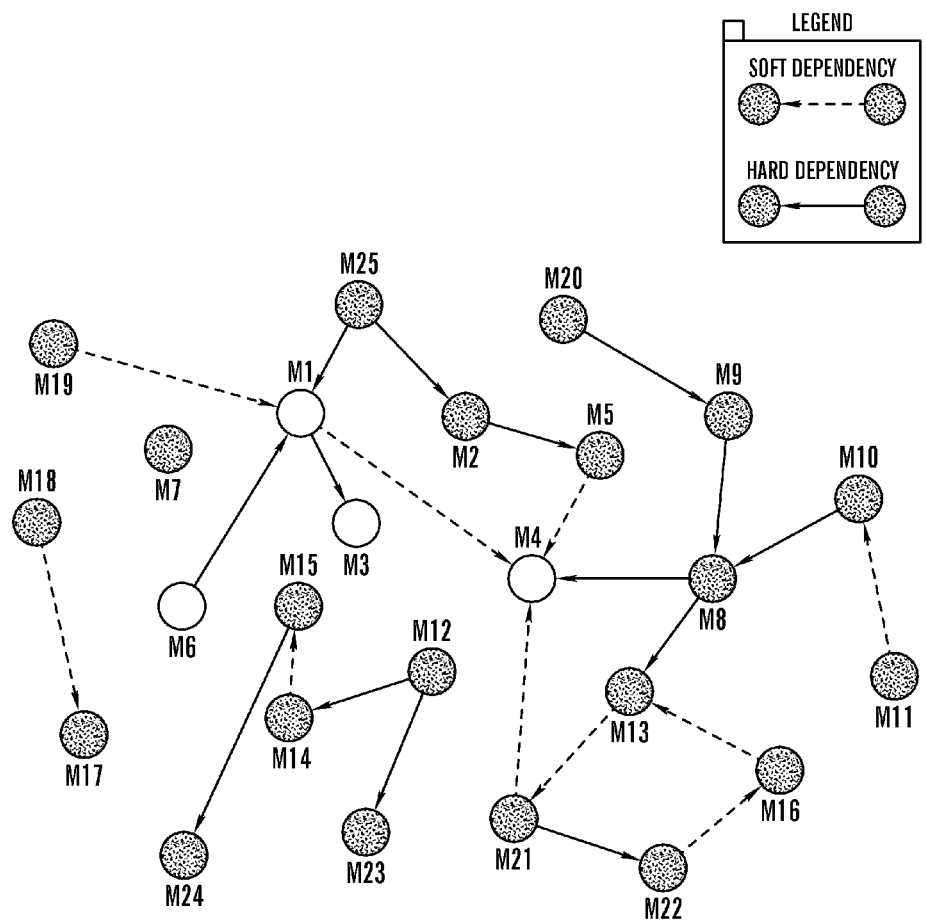
FIG. 21 is a diagram of an exemplary graph of the modules illustrated in FIG. 14 with any hard dependencies and soft dependencies between root module M6 and other modules.

When in step 108 the client computing device 12 determines there are no identified and unprocessed root modules, then the No branch is taken back to step 110. Additionally, a graph illustrating the soft and hard dependencies for each of the root modules in the example described herein is illustrated in FIG. 15.

In step 110, the client computing device automatically generates an ordered module list for each root module based on any of the identified soft and hard dependencies. By way of example only, the following exemplary instructions are used to generate an ordered module list for each root module, although other manners for generating the ordered module list can be used.

This exemplary module list generation process or algorithm of programmed and stored instructions takes the root module as its only parameter. It produces an ordered list of modules based on a special graph traversal algorithm. This algorithm is applied to each root module in the master configuration to provide several potentially overlapping ordered module lists. The algorithm can be described using the following recursive pseudo code:

```
Let softDependencies be an array
Let seenSoftDependency be a set
Let seenHardDependency be a set
Sub processDependency
    Let node be the node to process
    Let subList be an array
    Push node into subList array
    For each hard dependency not in seenHardDependency set
        Add hard dependency to seenHardDependency set
        Call processDependency on hard dependency
        For each node in return array (in reverse order)
            Insert node at beginning of subList
    For each soft dependency not in seenSoftDependency set
        Add soft dependency to seenSoftDependency set
        Push soft dependency into softDepenencies array
    Return subList
Sub processRootModule
    Let rootModule be the node to process
    Clear softDependencies array
    Clear seenSoftDependency
    Clear seenHardDependency
    Call processDependency on rootModule
    Let orderedList be the returned subList
    For each node in softDependencies array
        Call processDependnecies on soft dependency
        For each node in return array
            push node onto orderdList
    Let nodeSeen be a set
    For each node in orderedList
        If node is not in nodeSeen set
            Add node to nodeSeen set
        Else
            Remove node from orderedList
    Return orderedList
```

The final result is a set of eight ordered module lists associated to the eight modules identified as root modules: M7; M18; M25; M20; M11; M21; M12; and M6. The ordered lists in these examples contain the following modules:

M7: M7
M18: M18, M17
M25: M5, M2, M3, M1, M25, M4
M20: M13, M4, M8, M9, M20, M22, M21, M16
M11: M11, M13, M4, M8, M10, M22, M21, M16
M21: M22, M21, M4, M16, M13
M12: M23, M14, M12, M24, M15
M6: M3, M1, M6, M4

In step 112, the client computing device 12 uses a minimization or refinement process to produce mutually exclusive ordered module lists described herein, although other manners to minimize or refine the ordered lists can be used. In these embodiments, the module list refinement process is used to remove the overlap between the ordered module lists. Additionally, this process is used to further facilitate deferred loading of the modules.

In this particular example, when the minimization or refinement process is executed by the client computing device 12 a determination is made about which ordered lists of modules need to be sequentially loaded and which ordered lists of modules can be randomly loaded. Modules in ordered lists which need to be sequentially loaded will be loaded when the browser executing in the client computing device 12 or other computing device is initializing the application related to these libraries. Modules in ordered lists which can be randomly loaded only will be downloaded and processed by the browser in the client computing device 12 when and if they are needed, thus providing deferred loading.

Figure 22:
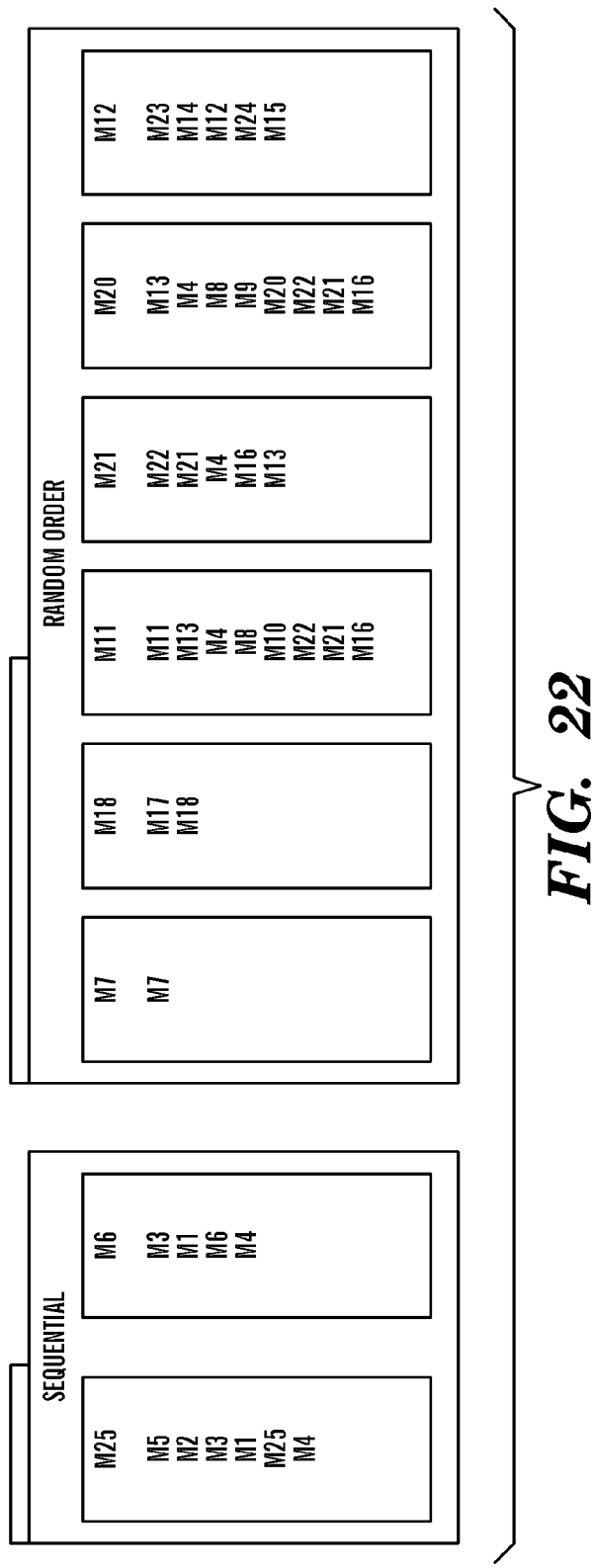
FIG. 22 is a table of libraries with sequential and random ordered module lists.

In this particular example, a diagram of the categorization of the ordered lists of root modules is illustrated in FIG. 22. As illustrated, ordered lists of modules for root modules M25 and M6 are determined by the client computing device 12 to require sequential loading while ordered lists for modules M7, M18, M11, M21, M20, and M12 are determined to allow random loading. These order lists of modules could be used in their current format, however the present invention provides further advantages by refining these lists to strip duplicates and thus remove subsequent downloads of the same resources.

Figure 23:
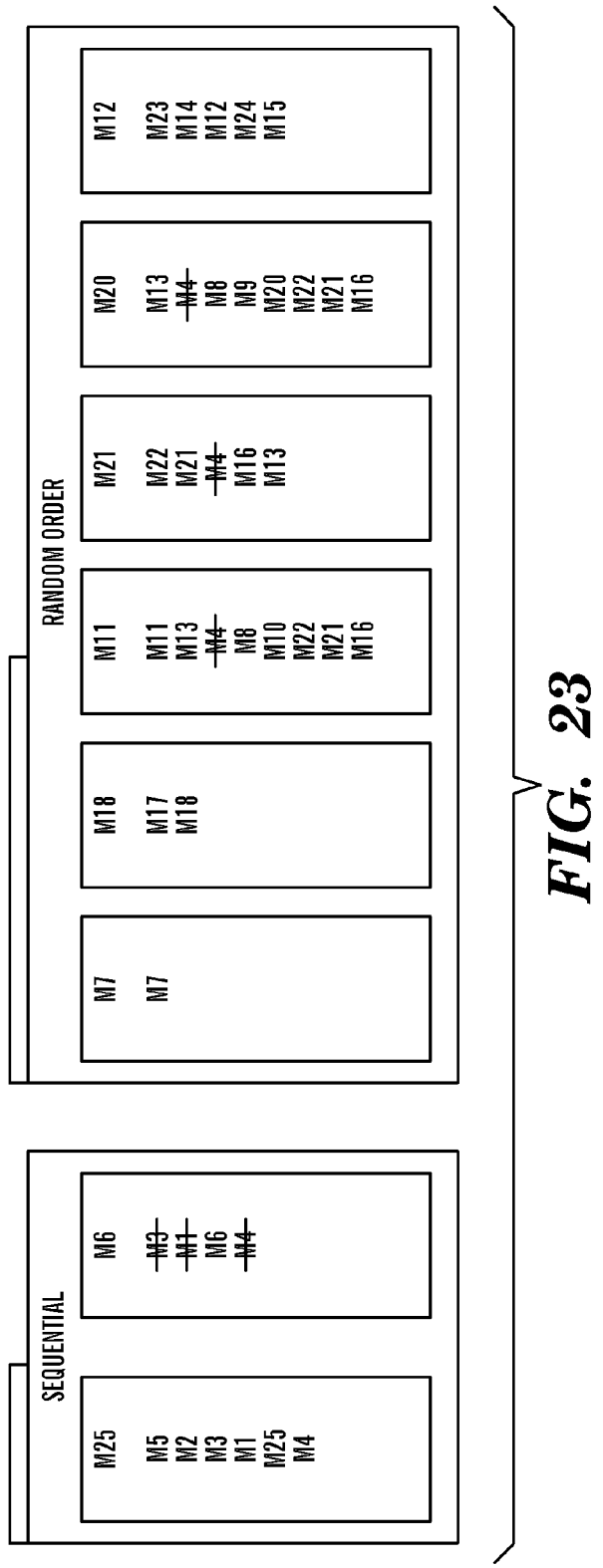
FIG. 23 is a table of the libraries with sequential and random ordered module lists with duplicate modules removed.

The client computing device 12 executes a further refinement or minimization process in order to remove duplicate modules found in the ordered lists of modules as described herein, although other manners for removing duplicates and other further refinements and minimizations can be used. In these embodiments, if one or more modules are downloaded during the sequential download process during the initialization phase of the application, then those modules do not need to be downloaded a second time when the modules in the order lists which can be randomly loaded are loaded. An example of this refinement or minimization is illustrated in FIG. 23 where modules loaded in the ordered lists of modules which are duplicated in the ordered lists of modules which can be randomly loaded are removed by the client computing device 12 and for illustration purposes are crossed out in the graph.

By way of example only, the following is the pseudo code or programmable instructions for the duplicate sequential module refinement algorithm process which can be executed by the client computing device 12:

```
Let seenModule be a set
For each sequential module list (in the order they will be loaded)
    For each module in the module list
        If module is in seenModule set
            Remove module from module list
        Else
            Add module to seenModule set
For each randomly loaded module list
    For each module in the module list
        If module is in seenModule set
            Remove module from module list
```

In step 112, the client computing device 12 also identifies any duplicate modules in the ordered lists of modules which can be randomly loaded and consolidates the identified duplicate modules into a shared list, although other manners for generating a shared list can be used and other types of refinements and minimizations can be implemented. Once the shared list is generated, the browser operating in the client computing device 12 and executing the application loads the modules in the shared list before loading modules in the ordered lists of modules which can be randomly loaded. By way of example only, programmed instructions executable by the client computing device for implementing this portion of the process are set forth below, although other manners for generating and utilizing a shared list can be used:

```
Let seenModule be a set
Let sharedList be an array
For each randomly loaded module list
    For each module in the module list
        Add module to seenModule set
For each randomly loaded module list
    For each module in module list
        If module is in seenModule set
            Remove module from module list
            If module is not in sharedList array
                Push module onto sharedList array
```

Figure 24:
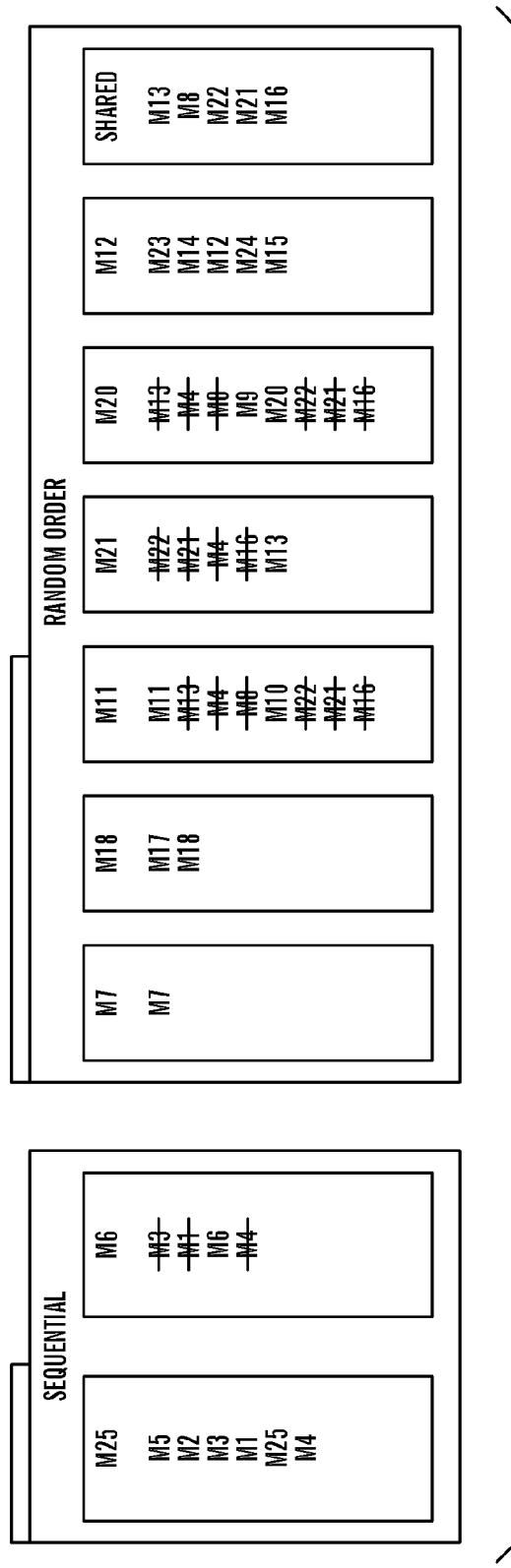
FIG. 24 is a table of the libraries with sequential and random ordered module lists with a generated shared list and further duplication of modules removed.

An example of the application of this minimization process is illustrated in FIG. 24. As shown, a list of modules shared by the ordered lists of randomly loaded modules is generated and subsequently loaded first so that any duplicate modules appearing in the ordered lists of randomly loaded modules do not need to be loaded. For illustration purposes, these duplicate modules are crossed out in the ordered lists of randomly loaded modules shown in FIG. 24.

Accordingly, after the client computing device 12 has applied the two refinement or minimization processes described above, in this example the client computing device 12 generates the following ordered lists of modules:

M7: M7
M18: M18, M17
M25: M5, M2, M3, M1, M25, M4
M6: M6
M20: M9, M20
M11: M11, M10
M21:
M12: M23, M14, M12, M24, M15
Shared: M13, M8, M22, M21, M16

These ordered lists are now mutually exclusive, which will prevent the same resource from being loaded twice. All of the modules or resources which were unique to the ordered lists of randomly loaded modules and which appeared in multiple randomly loaded module lists are now only in the shared list.

In step 114, the client computing device 12 generates the final mutually exclusive ordered lists of modules as illustrated above. The resource list generation algorithm is used to create the full ordered resource lists from the ordered module lists. This step is necessary because before this process is applied, the lists includes only modules and the browser in the client computing device 12 needs the resource file paths, not the module information. Therefore, this process executed by the client computing device 12 is responsible for exploding the refined ordered list of modules into a list of resources contained in those modules.

Because each of the modules potentially contains multiple resources and also supports dependencies between those resources, the client computing device executes programmed instructions described herein to calculate the ordered list of resources a module contains. By way of example, the following inner module resource list generation process described with the following pseudo code or programmable instructions is executed by the client computing device 12, although other manners for determining the resources a module contains can be used:

```
Sub processDependency
    Let node be the root module or resource to process
    Let subList be an array
    Push node into subList array
    For each dependency
        Call processDependency on dependency
        For each node in return array (in reverse order)
            Insert node at beginning of subList
    Return subList
Sub processModule
    Let rootModule be the node to process
    Call processDependency on rootModule
    Let orderedList be the returned subList
    Let nodeSeen be a set
    For each node in orderedList
        If node is not in nodeSeen set
            Add node to nodeSeen set
        Else
            Remove node from orderedList
    Return orderedList
```

Accordingly, in these embodiments the client computing device 12 will execute this process on each module within each of the ordered lists of modules processed for the application. This process returns the ordered set of resources contained within the module. By way of example only, consider the ordered list of modules for root module M2 with the hard dependencies to resources A.js, C.js, and B.css shown in FIG. 25 and for root module M1 shown in FIG. 26 with the hard dependencies to resources A.*, B.*, A.css, B.css, C.css, 1.img, 2.img, 3.img, 4.img, A.js, B.js, and C.js shown in FIG. 26.

Figure 25:
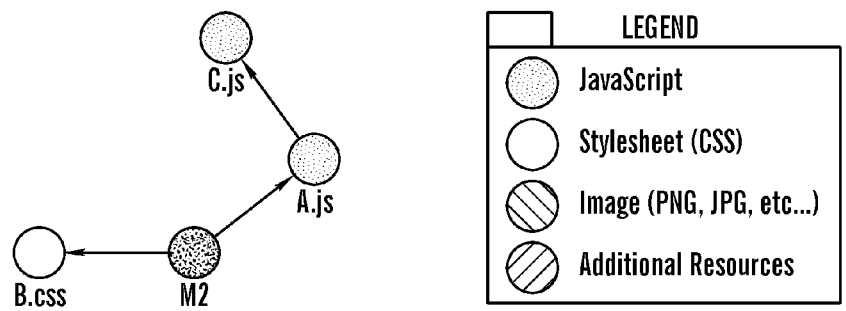
FIG. 25 is a diagram of root module M2 with the hard dependencies to resources A.js, C.js, and B.css.
Figure 26:
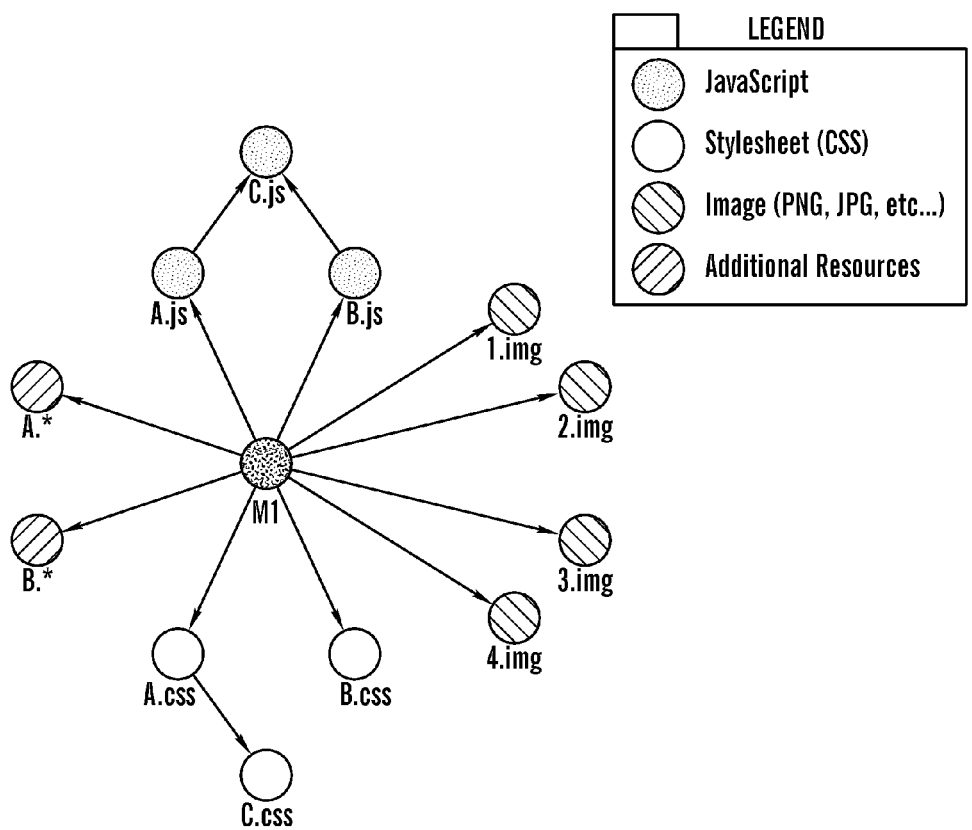
FIG. 26 is a diagram of a root module M1 with hard dependencies to resources A.*, B.*, A.css, B.css, C.css, 1.img, 2.img, 3.img, 4.img, A.js, B.js, and C.js.

Referring more specifically to FIG. 25, a diagram of root module M2 is illustrated. After applying the process described above to return the ordered set of resources contained within the module M2 and processing resources clockwise from A.js, the following ordered resource list is returned:

M2_B.css, M2_Cjs, M2_A.js

The same process can then be applied to M1 to return the ordered set of resources contained within the module M1. After applying the process described above to return the ordered set of resources contained within the module M1 and processing resources clockwise from A.js, the following ordered resource list is returned:

M1_A.*, M1_B.*, M1_C.css, M1_A.css, M1_B.css, M1_4.img, M1_3.img, M1_2.img, M1_1.img, M1_C.js, M1_B.js, M1_A.js By concatenating the ordered resource lists produced by each module in the ordered module list with the client computing device 12, the final ordered resource list can be produced. In this example, the following is the resulting ordered resource list produced by the client computing device 12 concatenating M1's resource list to the end of M2's resource list:

M2_B.css, M2_Cjs, M2_A.js, M1_A.*, M1_B.*, M1_C.css, M1_A.css, M1_B.css, M1_4.img, M1_3.img, M1_2.img, M1_1.img, M1_C.js, M1_B.js, M1_A.js In step 116, the client computing device 12 provides the final mutually exclusive ordered lists and this method ends.

In an alternative embodiment, the method described herein may also add an additional processing step after the resource lists are generated. In this step, the client computing device 12 identifies all files of the same type, such as all JavaScript (JS) files, and copies their contents into a single file. Since they would be copied in order, the dependencies would all be maintained. The browser would then only need to load the single JS file instead of the prior individual JS files that now comprise this one file. This step would improve speed with the application significantly. Additionally, the resource list would need to be updated by client computing device 12 prior to being used, as it would need to reference the new consolidated file, not each individual file that made it up.

This technique could also be applied to images in order to generate a "CSS Sprite" image. Basically, an image which contains many other images. CSS would then be used to access each individual image from within the client as disclosed in U.S. patent application Ser. No. 12/284,780 for, "Methods For Generating One Or More Composite Image Maps And Systems Thereof," inventor Kyle Adams, filed on Sep. 25, 2008, which is herein incorporated by reference in its entirety including how this could be automated.

In yet another alternative embodiment, the method described herein may also add an additional processing step to enable parallel downloading. In the embodiments of the present invention described here, the files referenced by a resource list are downloaded one by one by the client computing device 12. This can be slow, and the browser in the client computing device 12 usually allows multiple connections, so the ability to download multiple files form the same resource list at the same time would be greatly beneficial. For this reason, the resource lists could be extended to include information about which files each file has a dependency on. This would require that the resource list generation process and the module list generation process described earlier herein be modified to maintain additional information as illustrated in the example below. In this example for root modules M2, M1 described earlier, the resulting resource list would be modified by way of example to:

```
M2_B.css
M2_C.js
M2_A.js
    Depends on M2_C.js
M1_A.*
M1_B.*
M1_C.css
M1_A.css
    Depends on M1_C.css
    Depends on M2_B.css
M1_B.css
    Depends on M2_B.css
M1_4.img
M1_3.img
M1_2.img
M1_1.img
M1_C.js
    Depends on M2_A.js
    Depends on M2_C.js
M1_B.js
    Depends on M1_C.js
    Depends on M2_A.js
    Depends on M2_C.js
```

```
M1_A.js
    Depends on M1_C.js
    Depends on M2_A.js
    Depends on M2_C.js
```

When the browser in the client computing device 12 loads this resource list, it will ensure that all dependencies have been loaded prior to loading the file. Thus, before M1_A.js can be loaded, M1_C.js, M2_A.js and M2_C.js must already be loaded. Once these dependencies are established, the browser in the client computing device can download as many files as it can at the same time as long as it respects the dependencies.

Figure 27:
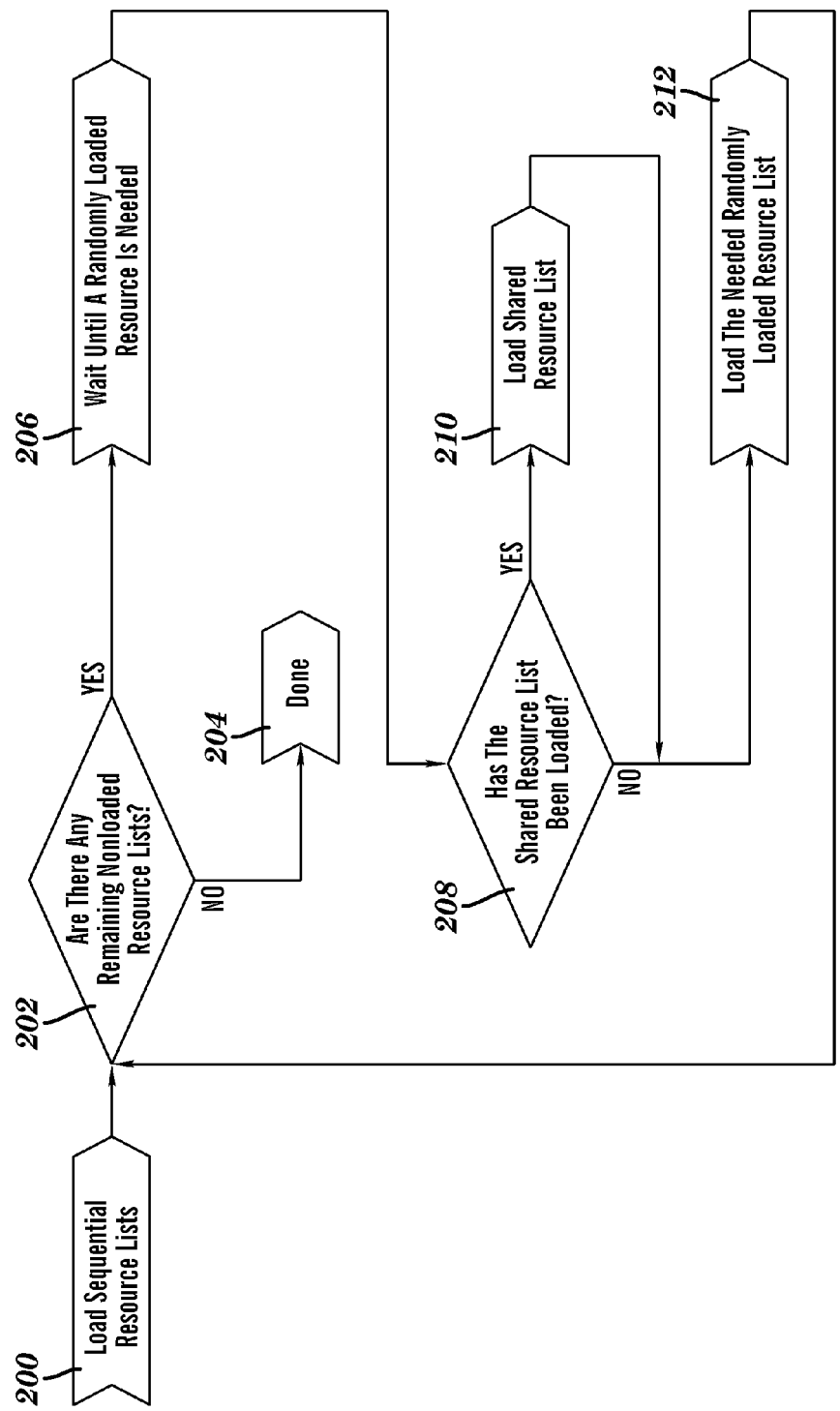
FIG. 27 is a method for using resource lists obtained from determining resource dependency in an application in accordance with other embodiments of the present invention.

Referring now to FIG. 27, a method for using resource lists obtained from determining resource dependency in an application in accordance with other embodiments of the present invention will now be described, although other methods for using these ordered lists can be used. In this particular illustrative example, a web application is running in the browser on the client computing device 12 and is using the automatically generated resource lists as described in greater detail above to download and process data needed by that application. The core instructions and resources for this web application would be found in the sequential resource lists, while the various dialogs and secondary interfaces would be stored in the randomly loaded resource lists.

In step 200, the client computing device 12 loads each sequential resource list in the same order as the module list refinement process described earlier was applied. This involves downloading the files specified in the ordered resource lists one by one until all resources have been loaded. This behavior is identical to concatenating the resource lists in the same order the module list refinement process was applied, and then processing the master concatenated resource list.

In step 202, the client computing device 12 checks to determine f there are any randomly loaded resource lists which have not been loaded. If in step 202 there are no randomly loaded resource lists which have not been loaded, then the No branch is taken to step 204. In step 204, this method ends because everything for this web application has been loaded into the browser in client computing device 12 and no more loading will be necessary. If however in step 202, there are randomly loaded resource lists which have not been loaded, then the Yes branch is taken to step 206.

In step 206, the client computing device 12 waits until a randomly loaded resource list is needed by the web application being executed by the browser in the client computing device 12. This could happen for any number of reasons. By way of example only, if the web application needed to display a new window to the user and that window was sufficiently complex, it may require the loading of additional resources. These resources could be referenced in a randomly loaded resource list in order to allow the browser in the client computing device 12 to defer their loading until the window needs to be displayed. The application may terminate on this stage of the flow chart if some of the randomly loaded resource lists are not needed after a set period of time expires.

In step 208, the client computing device 12 checks to determine if this is the first time a randomly loaded resource list needs to be loaded. If in step 208, this is the first time a randomly loaded resource list needs to be loaded then the Yes branch is taken to step 210. If in step 208, this is not the first time a randomly loaded resource list needs to be loaded then the No branch is taken to step 212.

In step 210, the client computing device 12 loads the shared resource list as described in greater detail earlier. In step 212, the client computing device 12 now loads the requested randomly loaded resource list.

Accordingly, as described and illustrated by the exemplary embodiments herein the present invention provides number of advantages including an easier and more effective method and system for automatically determining resource dependency in an application. Additionally, the present invention is able to refine or minimize the ordered resource lists and to further enhance the speed of downloading resources to execute the application.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefor, is not intended to limit the claimed processes to any order except as may be specified in the claims. Accordingly, the invention is limited only by the following claims and equivalents thereto.

What is claimed is:

1. A method for automatically determining resource dependency when executing an application with a web browser on a client device, the method comprising:
   receiving, with the client device, input requesting execution of the application with the web browser of the client device, wherein the application comprises a plurality of modules stored on a server that is distinct from the client device, each of the modules being associated with one or more different resource files;
   responsive to receiving the request to execute the application with the web browser and prior to downloading the modules from the server, accessing, with the client device, an extensible markup language (XML) file specifying a master configuration for the application;
   identifying, with the client device, one or more root modules of the plurality of modules;
   automatically identifying, with the client device and based at least in part on the master configuration, one or more dependencies between two or more of the modules of the application to be executed by the web browser, the two or more of the modules including at least one of the one or more root modules, wherein the one or more dependencies indicate one or more orderings in which the two or more of the modules are to be downloaded from the server for execution;
   determining, with the client device, which one of at least two different types of dependencies corresponds to each of the identified one or more dependencies between the two or more of the modules, wherein the at least two different types of dependencies comprise a hard dependency that requires a fixed loading order between dependent modules of the application, and wherein the at least two different types of dependencies further comprise a soft dependency that requires loading of, but permits a flexible loading order between, dependent modules of the application;
   determining, with the client device, based on the identified one or more dependencies between the two or more of the modules and on the one or more identified root modules, and further based on the respective determined type of dependency that corresponds to each of the identified one or more dependencies, one or more ordered lists that specify the one or more orderings in which to download the two or more of the modules from the server; and
   downloading, with the web browser of the client device, the two or more of the modules from the server according to the determined one or more ordered lists.

2. The method of claim 1, further comprising refining loading of the two or more of the modules specified by the determined one or more ordered lists.

3. The method of claim 2, wherein refining the loading of the two or more of the modules specified by the determined one or more ordered lists further comprises:
   identifying which of the determined one or more ordered lists require sequential loading and which of the determined one or more ordered lists permit random loading; and
   deferring loading of any of the two or more of the modules specified by the determined one or more ordered lists that permit random loading.

4. The method of claim 2, wherein refining the loading of the two or more of the modules specified by the determined one or more ordered lists further comprises:
   identifying which of the determined one or more ordered lists require sequential loading and which of the determined one or more ordered lists permit random loading; and
   removing duplication of any of the two or more of the modules appearing in the one or more ordered lists that require sequential loading from the determined one or more ordered lists that permit random loading.

5. The method of claim 4, further comprising:
   identifying any of the two or more of the modules that appear in more than one of the determined one or more ordered lists that permit random loading;
   generating a shared ordered list comprising the identified modules that appear in more than one of the determined one or more ordered lists that permit random loading; and
   generating an updated determined one or more ordered lists comprising the determined one or more ordered lists that require sequential loading, the shared ordered list, and the determined one or more ordered lists that permit random loading with the identified modules of the shared ordered list removed.

6. The method of claim 5, wherein the updated determined one or more ordered lists direct the client device to load those modules specified by the shared ordered list before a first loading of any modules specified by the determined one or more ordered lists that permit random loading with the identified modules of the shared ordered list removed.

7. The method of claim 1 further comprising creating one or more ordered lists of resources from the determined one or more ordered lists.

8. A non-transitory computer readable medium having stored thereon instructions for determining resource dependency when executing an application with a web browser on a client device, the instructions comprising machine executable code which, when executed by at least one processor, causes the at least one processor to:
   receive, with the client device, input requesting execution of the application with the web browser of the client device, wherein the application comprises a plurality of modules stored on a server that is distinct from the client device, each of the modules being associated with one or more different resource files;

responsive to receiving the request to execute the application with the web browser and prior to downloading the modules from the server, access, with the client device, an extensible markup language (XML) file specifying a master configuration for the application;

identify, with the client device, one or more root modules of the plurality of modules;

automatically identify, with the client device and based at least in part on the master configuration, one or more dependencies between two or more of the modules of the application to be executed by the web browser, the two or more of the modules including at least one of the one or more root modules, wherein the one or more dependencies indicate one or more orderings in which the two or more of the modules are to be downloaded from the server for execution;

determine, with the client device, which one of at least two different types of dependencies corresponds to each of the identified one or more dependencies between the two or more of the modules, wherein the at least two different types of dependencies comprise a hard dependency that requires a fixed loading order between dependent modules of the application, and wherein the at least two different types of dependencies further comprise a soft dependency that requires loading of, but permits a flexible loading order between, dependent modules of the application;

determine, with the client device, based on the identified one or more dependencies between the two or more of the modules and on the one or more identified root modules, and further based on the respective determined type of dependency that corresponds to each of the identified one or more dependencies, one or more ordered lists that specify the one or more orderings in which to download the two or more of the modules from the server; and download, with the web browser of the client device, the two or more of the modules from the server according to the determined one or more ordered lists.

9. The non-transitory computer readable medium of claim 8, wherein the instructions further cause the at least one processor to refine loading of the two or more of the modules specified by the determined one or more ordered lists.

10. The non-transitory computer readable medium of claim 9, wherein the instructions that cause the at least one processor to refine the loading of the two or more of the modules specified by the determined one or more ordered lists further cause the at least one processor to:

identify which of the determined one or more ordered lists require sequential loading and which of the determined one or more ordered lists permit random loading; and defer loading of any of the two or more of the modules specified by the determined one or more ordered lists that permit random loading.

11. The non-transitory computer readable medium of claim 9, wherein the instructions that cause the at least one processor to refine the loading of the two or more of the modules specified by the determined one or more ordered lists further cause the at least one processor to:

identify which of the determined one or more ordered lists require sequential loading and which of the determined one or more ordered lists permit random loading; and remove duplication of any of the two or more of the modules appearing in the one or more ordered lists that require sequential loading from the determined one or more ordered lists that permit random loading.

12. The non-transitory computer readable medium of claim 11, wherein the instructions further cause the at least one processor to:

identify any of the two or more of the modules that appear in more than one of the determined one or more ordered lists that permit random loading;

generate a shared ordered list comprising the identified modules that appear in more than one of the determined one or more ordered lists that permit random loading; and generate an updated determined one or more ordered lists comprising the determined one or more ordered lists that require sequential loading, the shared ordered list, and the determined one or more ordered lists that permit random loading with the identified modules of the shared ordered list removed.

13. The non-transitory computer readable medium of claim 12, wherein the updated determined one or more ordered lists direct the client device to load those modules specified by the shared ordered list before a first loading of any modules specified by the determined one or more ordered lists that permit random loading with the identified modules of the shared ordered list removed.

14. The non-transitory computer readable medium of claim 8, wherein the instructions further cause the at least one processor to create one or more ordered lists of resources from the determined one or more ordered lists.

15. A system that automatically determines resource dependency when executing an application with a web browser on a client device in the system, the system comprising:

an application computing device having at least one processor and a web browser executing thereon;

an input device that receives a request for execution of an application with the web browser, wherein the application comprises a plurality of modules stored on a server that is distinct from the client device, each of the modules associated with one or more different resource files;

an identification system of the application computing device that, prior to downloading modules from the server, accesses an extensible markup language (XML) file specifying a master configuration for the application, identifies one or more root modules of the plurality of modules, and automatically identifies one or more dependencies between two or more modules in the application executing on the client, the two or more of the modules including at least one of the one or more root modules, wherein the one or more dependencies indicate one or more orderings in which the two or more of the modules are to be downloaded from the server for execution;

a resource dependency processing system of the application computing device that:

determines which one of at least two different types of dependencies corresponds to each of the identified one or more dependencies between the two or more of the modules, wherein the at least two different types of dependencies comprise a hard dependency that requires a fixed loading order between dependent modules of the application, and wherein the at least two different types of dependencies further comprise a soft dependency that requires loading of, but permits a flexible loading order between, dependent modules of the application; and determines, based on the identified one or more dependencies between the two or more of the module and on the one or more identified root modules, and further based on the respective determined type of dependency that corresponds to each of the identified one or more dependencies, one or more ordered lists that specify the one or more orderings in which to download the two or more of the modules in the application from the server; and an interface system of the application computing device that downloads, for the application executing on the client device, the two or more of the modules from the server according to the determined one or more ordered lists.

16. The system of claim 15, further comprising a refinement system of the application computing device that refines loading of the two or more of the modules specified by the determined one or more ordered lists.

17. The system of claim 16, wherein the refinement system identifies which of the determined one or more ordered lists require sequential loading and which of the determined one or more ordered lists permit random loading and defers loading of any of the two or more of the modules specified by the determined one or more ordered lists that permit random loading.

18. The system of claim 16, wherein the refinement system identifies which of the determined one or more ordered lists require sequential loading and which of the determined one or more ordered lists permit random loading and removes duplication of any of the modules appearing in the one or more ordered lists that require sequential loading from the determined one or more ordered lists that permit random loading.

19. The system of claim 18, wherein the refinement system identifies any of the two or more of the modules that appear in more than one of the determined one or more ordered lists that permit random loading, generates a shared ordered list comprising the identified modules that appear in more than one of the determined one or more ordered lists that permit random loading and generates an updated determined one or more ordered lists comprising the determined one or more ordered lists that require sequential loading, the shared ordered list, and the determined one or more ordered lists that permit random loading with the identified modules of the shared ordered list removed.

20. The system of claim 19, wherein the updated determined one or more ordered lists direct the application computing device to load those modules specified by the shared ordered list before a first loading of any modules specified by the determined one or more ordered lists that permit random loading with the identified modules of the shared ordered list removed.

21. The system of claim 15, further comprising an ordered resource list generation system of the application computing device that creates one or more ordered lists of resources from the determined one or more ordered lists.

22. The method of claim 1, wherein downloading the two or more of the modules comprises downloading each of the two or more of the modules with the web browser from the server at runtime on the fly when the respective module is needed by the web browser.

* * * * *